United States Patent [19]

Matsushita et al.

[11] Patent Number: 5,267,113
[45] Date of Patent: Nov. 30, 1993

[54] MAGNETIC HEAD

[75] Inventors: Takeshi Matsushita; Akinobu Sano; Shigeyuki Adachi; Toshizo Watanabe, all of Shizuoka, Japan

[73] Assignee: Minebea Co., Ltd., Nagano, Japan

[21] Appl. No.: 758,115

[22] Filed: Sep. 12, 1991

[30] Foreign Application Priority Data

Sep. 13, 1990 [JP] Japan .................. 2-243430

[51] Int. Cl.⁵ .......................................... G11B 5/127
[52] U.S. Cl. ................................. 360/127; 360/126
[58] Field of Search .............................. 360/127, 126

[56] References Cited

U.S. PATENT DOCUMENTS

| 4,608,293 | 8/1986 | Wada et al. ................ 428/141 |
| 4,953,049 | 8/1990 | Okuda et al. ................ 360/126 |
| 5,038,242 | 8/1991 | Fukushima et al. .......... 360/120 |

FOREIGN PATENT DOCUMENTS

| 57-133515 | 8/1982 | Japan ..................... 360/127 |
| 2170640 | 8/1986 | United Kingdom ...... 360/127 |

*Primary Examiner*—Constantine Hannaher
*Attorney, Agent, or Firm*—Oliff & Berridge

[57] ABSTRACT

There is disclosed a magnetic head which can be used for various magnetic disk drives and easily and economically fabricated. The head comprises a magnetic core consisting of a ferrite. The core is composed of two parts bonded together with a glass. A gap, a magnetic metal film, and an intermediate film are formed between the two parts of the core. The intermediate film is formed of the same glass as said glass by sputtering and has a thickness between 30 and 150 Å. The metal film has a thickness between 1 and 10 μm. The glass consists mainly of $SiO_2$, for example.

6 Claims, 3 Drawing Sheets

TIME

MAGNETIC HEAD

FIELD OF THE INVENTION

The present invention relates to a magnetic head used for various magnetic disk drives.

BACKGROUND OF THE INVENTION

Usually, the cores of magnetic heads are made of ferrites. Where a high magnetic permeability should be obtained, a magnetic metal film is formed on the surface of such a ferrite core. If this magnetic film is directly formed on the ferrite core, the following various problems take place:

(1) The magnetic metal film adheres to the core with a small force and, therefore, the film often peels off during the manufacture of the magnetic head.

(2) During thermal treatment, the ferrite reacts with the magnetic metal film, giving rise to a magnetically deteriorated layer. As a result, a pseudo gap is created. Thus, a pseudo output is produced as shown in FIG. 5.

(3) Soft magnetic characteristics intrinsic in the magnetic metal film cannot be obtained.

In order to solve these problems, the formation of an intermediate film, called a diffusion preventive film, between the ferrite core and the metal film may be contemplated. The above-described problems may be solved by the use of this intermediate film. However, this urges the use of an additional material, which increases the manufacturing costs and the number of the manufacturing steps.

SUMMARY OF THE INVENTION

Accordingly, it is an object of the present invention to provide a magnetic head which has a ferrite core, an intermediate film, and a magnetic metal film adhering to the core more firmly than heretofore, prevents formation of a pseudo gap, has a soft magnetic film exhibiting improved magnetic characteristics, and makes it unnecessary to provide any special film formation means during the formation of the intermediate film.

The above object is achieved by a magnetic head comprising: a magnetic core consisting of a ferrite and composed of two parts bonded together with a glass; a magnetic metal film formed on the bonded surface of at least one of the two parts of the core; and a layer of a glass formed between said one part of the core and the metal film, the glass being identical with the glass formed to create the gap between the two parts of the core. In this structure, the metal film adheres to the magnetic core much more firmly than conventional.

DETAILED DESCRIPTION OF THE INVENTION

Figure 1:
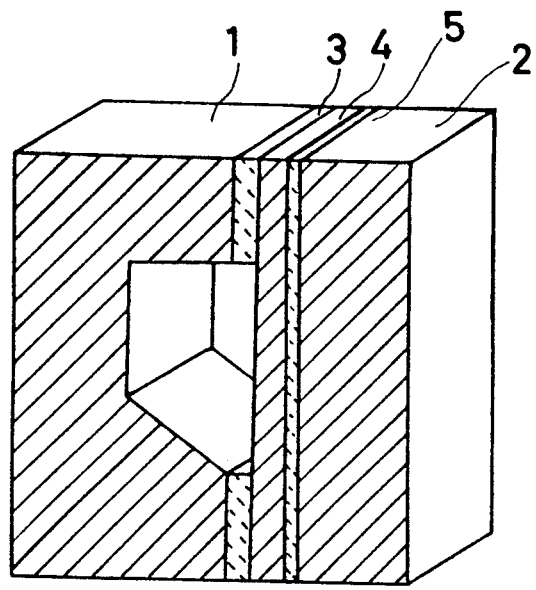
FIG. 1 is a perspective view in cross section of a magnetic head according to the invention.
Figure 2:
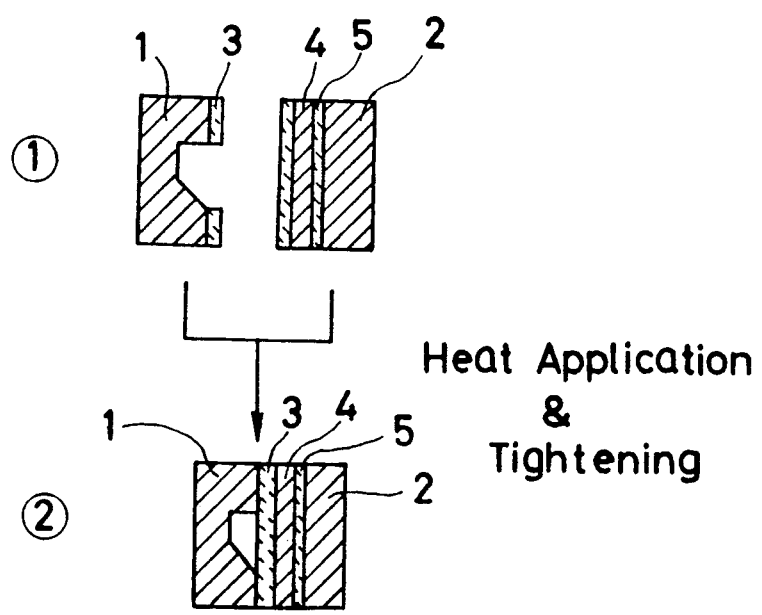
FIG. 2 is a vertical cross section of the magnetic head shown in FIG. 1, for illustrating steps for manufacturing the head.
Figure 3:
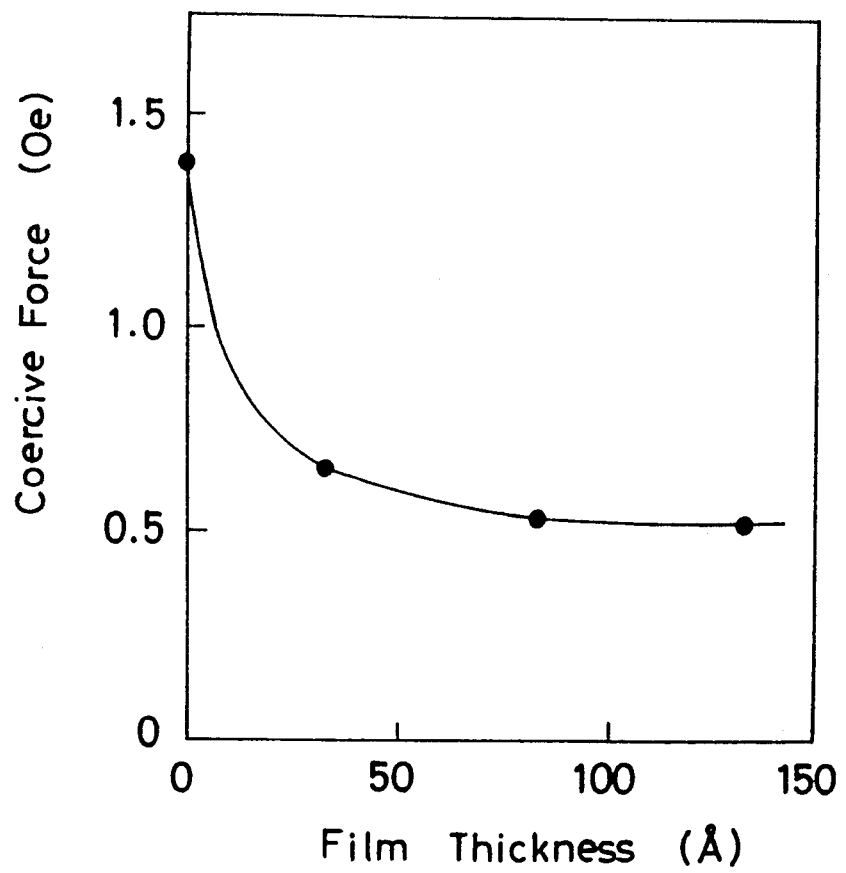
FIG. 3 is a graph showing the dependence of the coersive force of the magnetic head shown in FIG. 1 on the thickness of the intermediate film.

Referring to FIG. 1, there is shown a magnetic head embodying the concept of the invention. This head comprises a magnetic core made of a ferrite. The core is composed of two parts 1 and 2. A glass film 3, a magnetic metal film 4, and an intermediate film 5 are formed between the two parts 1 and 2 of the ferrite core. As shown in FIG. 2, the two parts 1 and 2 are fabricated separately. Then, they are bonded together. The intermediate film 5 is made of a bonding glass and has a thickness of 30-150 Å (0.003 $\mu$m-0.015 $\mu$m). The intermediate film 5 is formed by vacuum thin-film deposition techniques such as sputtering. It can be seen from FIG. 3 that the film thickness must be in excess of 30 Å (0.003 $\mu$m), the FIG. 3 showing the dependence of the coercive force on the film thickness of the intermediate film. If this film thickness is too large, then this portion will act as a pseudo gap.

Then, the magnetic metal film 4 is formed on this surface up to a thickness of 1-10 $\mu$m. Preferably, the metal film is formed on both surfaces. However, satisfactory results arise by forming the film only on the side of the trailing edge provided that the film thickness is in excess of 1.5 $\mu$m. Finally, the aforementioned bonding glass is deposited on both opposite surfaces up to a thickness of 0.1 to 0.2 $\mu$m. The film thickness is adjusted according to the desired gap length. It is possible to form a nonmagnetic film of $SiO_2$ between the magnetic metal film 4 and the layer of the bonding glass or between the magnetic core and the bonding glass. Thereafter, they are made to abut against each other and bonded together under pressure at a temperature exceeding the transition point of the bonding glass. For example, the bonding glass consists principally of $SiO_2$, $B_2O_3$, $Al_2O_3$, or $Na_2O$, and contains a trace amount of $Li_2O$. The transition point of this glass lies between 400° C. and 500° C.

As described thus far, the invention resides in a magnetic head comprising the ferrite magnetic core portions bonded together and the magnetic metal film formed on at least one of the bonded surfaces of the core portions. This head is characterized in that the layer of the glass which is the same as the glass used to form the gap is formed between said one portion of the magnetic core and the metal film. Therefore, the novel head yields the following advantages.

Figure 4:
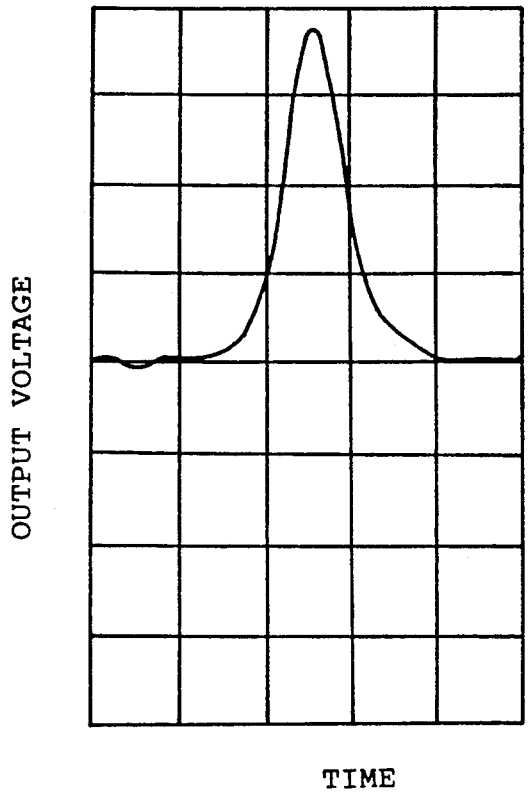
FIG. 4 is a graph showing the waveform of an isolated output signal from a magnetic head according to the invention.
Figure 5:
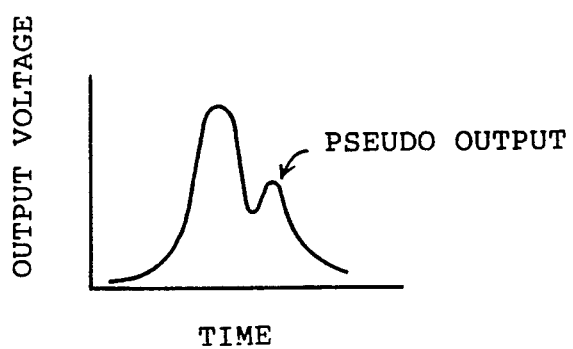
FIG. 5 is a graph showing the pseudo output from the prior art magnetic head.

(1) The waveform of an isolated waveform of the output signal from an example of the novel magnetic head which has been fabricated by us on an experimental basis is shown in FIG. 4. This waveform shows symmetry. Consequently, a pseudo gap is not present.

(2) The magnetic metal film adheres to the magnetic core more firmly than conventional methods and so no peeling occurs during the manufacture of the head. Hence, the manufacturing yield is improved greatly.

(3) The bonding glass used to create the gap is also employed to form the intermediate layer. In consequences, the manufacturing costs are reduced, and the efficiency of the manufacture is enhanced.

What is claimed is:

1. A magnetic head comprising:
   a first and second magnetic cores each formed of ferrite;
   an intermediate glass layer formed on an edge of the first magnetic core;

a magnetic metal film layer bonded on said intermediate glass layer; and a bonding glass formed on an edge of the second magnetic core for bonding together the edges of the first and second magnetic cores, such that the magnetic metal film layer is adhesively bonded to the bonding glass by applying heat and pressure above a transition point of the glass.

2. The magnetic head of claim 1, wherein said intermediate layer has a thickness between 0.003 μm and 0.015 μm.

3. The magnetic head of claim 1, wherein the layer of the first-mentioned glass for bonding together the pair of cores has a thickness between 0.1 and 0.2 μm.

4. The magnetic head of claim 1, wherein said intermediate glass layer and said bonding glass have a transition point between 400° C. and 500° C.

5. The magnetic head of claim 4, wherein said intermediate glass layer and said bonding glass comprises at least one of at least $SiO_2$, $B_2O_3$, $Al_2O_3$, and $Na_2O$.

6. A magnetic head comprising:

first and second magnetic cores each formed of ferrite;

an intermediate glass layer formed on an edge of the first magnetic core;

a magnetic metal film layer bonded on said intermediate glass layer; and a bonding glass formed on an edge of the second magnetic core for bonding together the edges of the first and second magnetic cores, said bonding glass having a transition temperature between 400° C. and 500° C., such that the magnetic metal film layer is adhesively bonded to the bonding glass by applying pressure to the first and second magnetic cores at a temperature exceeding the transition temperature of the bonding glass.

* * * * *